(12) United States Patent
Hsu

(10) Patent No.: US 6,836,952 B2
(45) Date of Patent: Jan. 4, 2005

(54) MOUSE PAD FABRICATION METHOD

(76) Inventor: Bob Hsu, Room #4G09, No. 5, Hsin Yi Rd., Sec. 5, Taipei (TW), 110

( * ) Notice: Subject to any disclaimer, the term of this patent is extended or adjusted under 35 U.S.C. 154(b) by 141 days.

(21) Appl. No.: 10/261,694

(22) Filed: Oct. 2, 2002

(65) Prior Publication Data
US 2004/0065975 A1 Apr. 8, 2004

(51) Int. Cl.$^7$ ............................................... B23P 25/00
(52) U.S. Cl. ...................... 29/527.3; 29/527.2; 29/527.1
(58) Field of Search ........................... 29/527.3, 527.2, 29/527.1; 156/212, 213, 285; 264/118

(56) References Cited
FOREIGN PATENT DOCUMENTS
KR      2002078143    * 10/2002
* cited by examiner Primary Examiner—John C. Hong
(74) Attorney, Agent, or Firm—Troxell Law Office PLLC

(57) ABSTRACT

A mouse pad fabrication method utilizing bark sourced from the cork tree. After the purging and cleaning of surface foreign matter, the tree bark is pulverized into appropriately minute particles. These are then blended with a natural resin glue and after becoming mixed evenly, the mixture is press formed under high temperature and high pressure and then trimmed to a required thickness. High temperature water misting is utilized for the rough edge removal task to soften and flatten the rough edges. As such, the finished mouse pad so fabricated has a more perfect, planar surface and provides for comfortable, non-injurious user contact. Since the finished product is constructed of cork, countless minute air holes are present in its corpus and junctions, which not only traps debris, but prolongs the usable service life of a mouse and, furthermore, enables smooth mouse operation during utilization.

9 Claims, 1 Drawing Sheet

MOUSE PAD FABRICATION METHOD

BACKGROUND OF THE INVENTION

1) Field of the Invention

The invention herein relates to a mouse pad fabrication method in which cork tree bark serves as a raw material that undergoes foreign matter purging and pulverization, blending thereafter with glue, press forming, trimming to a required thickness, and rough edge removal to complete a finished product.

2) Description of the Prior Art

Conventional mouse pads are typically constructed of a plastic raw material that is press formed or foam-fabricated, following which a surfacing is attached. However, since virtually all mouse pads produced by the said fabrication methods are of plastic construction and their surfaces are dense and non-porous, dust settles on the pad surfaces such that when a mouse (referring to a mechanical, semioptical unit) is moved, dust clings to the rubber roller wheel inside the mouse, accumulating on the rollers as the roller wheel revolve and thereby distorting the roller axis, eventually causing the roller wheel and roller to slip during contact, resulting in the mouse malfunctioning to the extent that computer screen cursor movement is no longer possible, with such buildups also reducing mouse service life.

To remedy the said problem, there are pads constructed of cork according to conventional cork veneer fabrication methods such as disclosed in the U.S. Pat. No. 4,104,103 "Method for Making Cork Wall Covering", the said method comprised of the following procedures:

a) Placing a sheet of backing material onto one side of a sheet of cork with a thermoplastic adhesive being disposed therebetween.

b) Adhering said backing material to said sheet of cork to form a two-ply sheet by subjecting said material to preselected temperature and pressure for a preselected period of time.

c) Flexing said sheet of cork and backing material by stress relieving sequentially each side of said two-ply sheet.

d) Coating the opposite side of said cork sheet with a mixture of a polyester resin adhesive and a curing agent for said polyester resin.

e) Placing a sheet of facing material onto said side of cork sheet including said polyester resin adhesive.

f) Adhering said facing material to said cork to form a three-ply sheet by subjecting said material to preselected temperature and pressure for a preselected period of time.

g) Cooling said three-ply sheet to a preselected temperature.

Based on the preceding disclosure, the said method consists of utilizing different property adhesives to respectively adhere the backing material and the facing material onto the cork sheet and then pressing the three plies together at a certain temperature and pressure. However, since the cork covering fabricated by the said method involves laminating the cork in between the backing material and the facing material, dust can still settle on the facing material and result in difficult mouse movement. Furthermore, since the cork, the backing material and the facing material are all adhesively conjoined together, the said backing material and facing material can still possibly separate from the cork.

Additionally, the U.S. Pat. No. 4,204,899 discloses a "Cork-resin Ablative Insulation for Complex Surfaces and Method for Applying the Same", with the procedures of the said method claimed as follows:

a) Mixing finely divided cork with a B-stage curable thermosetting resin, said resin comprising 20 to 60 weight percent of the mixture.

b) Forming the resulting mixture into a block.

c) B-stage curing the resin-containing block by heating at a temperature of 280° F. to 320° F. for a period of at least about 15 minutes.

d) Cutting the B-stage cured block into sheets.

e) Draping the resultant sheet material over said substrate or a surface corresponding in shape thereto.

f) Enclosing the resulting assembly in a vacuum bag.

g) Evacuating said bag.

h) Further curing the resultant shaped sheet material by heating said sheet material at a temperature of 280° F. to 320° F. for at least 30 minutes.

In the said method, although the resin and the cork are mixed together and then worked into the require shape by high temperature curing and sheet slicing, rough edges occur when cutting into sheets. As such, additional finishing is required after the completion of the curing procedure, which not only wastes time and effort, but leaves uneven barb-like edges that cut the hands.

SUMMARY OF THE INVENTION

In view of the said drawbacks, the applicant conducted extensive research and continuous experimentation that culminated in the successful development of the mouse pad fabrication method of the invention herein.

The primary objective of the invention herein is to provide a fabrication method that enhances the handling of mouse debris as the mouse is operated to achieve rapid and smooth sliding, wherein cork tree bark is utilized as a raw material, which after being purged of foreign matter and pulverized is blended with a natural resin glue and then press formed to increase structural strength and resilience before being trimmed to required thickness, and finally flattened and softened by high temperature and high pressure along with slight water misting to remove rough edges. As such, when utilized, not only are countless minute air holes present in the tree bark particle surface of the said mouse pad, but also junctions at the bonded areas of the said cork tree bark and natural resin such that accumulated debris is rubbed off by the junctions and minute air holes in the surface of the said mouse pad, with the said cork tree bark providing stiff support that reinforces the mouse pad against surface tension loss; and, furthermore, the mouse pad of the present invention has a more perfect, planar surface and will not injure the hands of the user or cause discomfort due to unevenness.

To enable a further understanding of the objectives, structural features, and other capabilities of the present invention, the brief description of the drawings below are followed by the detailed description of the invention herein.

DETAILED DESCRIPTION OF THE INVENTION

Figure 1:
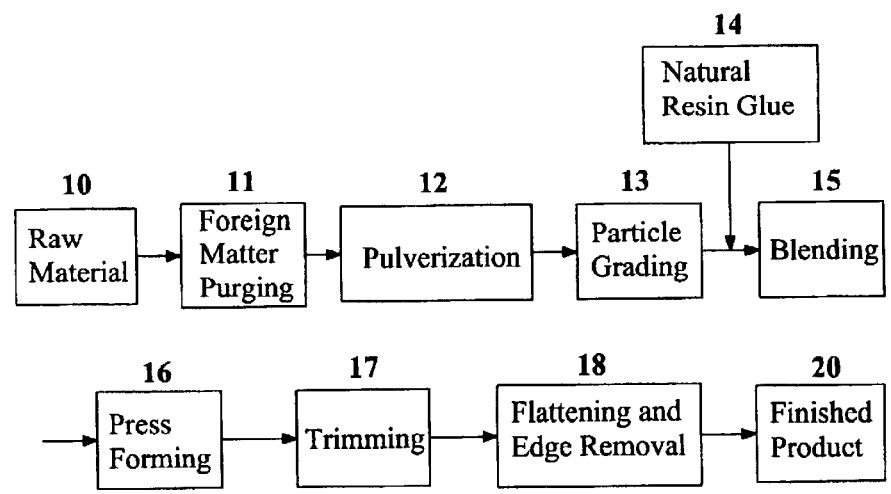
FIG. 1 is a block diagram of the fabrication process of the invention herein.

Referring to FIG. 1, the invention herein is a mouse pad fabrication method, the fabrication method comprised of the following procedures.

Step 1:

Cork tree bark having a thickness within one inch is collected as a raw material 10.

Step 2:

The surface of the tree bark is scrubbed in clear fresh water to purge and clean mud and foreign matter adhering to the surface of the said tree bark.

Step 3:

The tree bark cleaned in Step 2 is pulverized 12 by a milling device such that the size of each particle in the embodiment herein is within 1 mm$^3$ to 3 mm$^3$.

Step 4:

After undergoing Step 3, the tree bark is graded through a screening device to eliminate particles that are beyond a required size range, but the graded particles 13 still having foreign matter on their surfaces and that are too soft or too hard are for utilization are visually singled out and manually eliminated.

Step 5:

After a natural resin glue 14 and the graded particles 13 are blended 15 for a certain period, which in the embodiment herein is 15 minutes, such that the natural resin glue and particles are evenly mixed, the mixture is placed into a mold.

Step 6:

Under a high temperature and high pressure environment, 75° C. and 30 kg/cm$^2$ of pressure in the embodiment herein, the natural resin glue and particles in the said mold is press formed 16, and following a certain period, 72 hours in the embodiment herein, a semi-finished product is made, which in the embodiment herein is a slab of a given thickness and, furthermore, having a coarse surface.

Step 7:

The semi-finished product press formed in Step 6 is trimmed 17 by a planing machine to a suitable thickness, which in the embodiment herein ranges from more than 0.8 mm to less than 18 mm.

Figure 2:
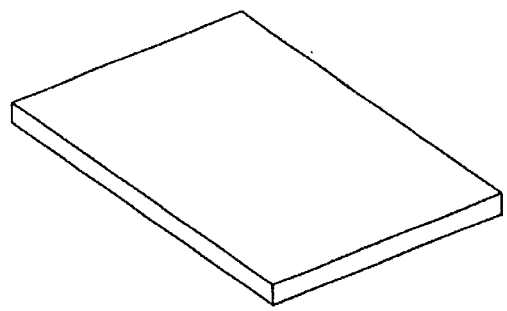
FIG. 2 is an isometric drawing of the finished product of the invention herein.

Step 8:

High temperature and high pressure (95° C. and 20 kg/cm$^2$, respectively, in the embodiment herein) along with a small volume of water misting are utilized for flattening and rough edge removal 18 tasks and after a certain period, which in the embodiment herein is 10 minutes, the rough edges are feathered away and then cutting to a required surface area and shape is done to complete a finished product 20 (as shown in FIG. 2).

As fabricated by the said procedures, the said rough edges of the finished product are softened and flattened under the high temperature, high pressure, and light water misting to achieve a perfect, planar mouse pad product; since the said mouse pad is constructed of the cork tree bark and natural resin glue mixture, it not only has a smoother surface after being trimmed to required thickness, but the bonded areas of the said cork tree bark and natural resin contain junctions and, furthermore, countless minute air holes are present in portions of the tree bark particle surface such that when a mouse (referring to a mechanical semi-optical mouse) is moved on the said mouse pad, debris clinging the rubber roller wheels in the mouse is rubbed off and deposited into the said junctions and minute air holes until a certain quantity of debris is accumulated, following which it is brushed off and utilization is resumed; and the support of the cork tree bark keeps the rubber roller wheels of the mouse from gouging the mouse pad to achieve smooth sliding capability and, furthermore, the said mouse pad provides for comfortable, non-injurious contact during operation by the user, while also prolonging the service life of the said mouse.

In summation of the foregoing section, since the finished product (that can have the form of a slab as well as a hollow or a solid body) of the mouse pad fabrication method of the invention herein is constructed of a mixture of blended cork tree bark and natural resin glue and, furthermore, in which rough edges are removed by a high temperature, high pressure means, the present invention has greater utility value in mouse pad manufacturing and, furthermore, improves upon the shortcomings of the conventional technology and is of enhanced functionality and practicality and, therefore, an ideal invention that fully meets new patent application requirements.

As such, the applicant lawfully submits the invention herein to the patent office for review and the granting of the commensurate patent rights.

What is claimed is:

1. A mouse pad fabrication method comprising the steps of:

a raw material consisting of cleaned tree bark sourced from a cork tree that is washed to purge and clean mud and foreign matter adhering to its surface;

pulverizing the cleaned tree bark into particles of predetermined size;

grading the tree bark following a second procedure through a screening device to eliminate particles that are beyond a required size range as well as particles still having foreign matter on their surfaces and that are too soft or too hard are for utilization;

blending a natural resin glue and the graded particles for a certain period such that the natural resin glue and particles are evenly mixed;

making a semi-finished product by press forming under a high temperature and high pressure environment for a certain period; and trimming the press formed semi-finished product to a suitable thickness;

features of which includes the use of high temperature and high pressure along with a small volume of water missing for flattening and rough edge removal tasks such that after a certain period, the rough edges are feathered away and then cutting to a required surface area and shape is done to complete a finished product.

2. The mouse pad fabrication method as claimed in claim 1 in which the said particles are pulverized to a size within 5.4 mm.

3. The mouse pad fabrication method as claimed in claim 1 in which the particles and natural resin glue are blended for 15 minutes.

4. The mouse pad fabrication method as claimed in claim 1 in which during the press forming, the respective temperature and pressure is 74° C. and 39 kg/cm$^2$.

5. The mouse pad fabrication method as claimed in claim 1 in which the press forming requires a period of approximately 72 hours.

6. The mouse pad fabrication method as claimed in claim 1 in which trimming achieves a thickness that ranges from more than 0.8 mm to less than 18 mm.

7. The mouse pad fabrication method as claimed in claim 1 in which during the edge removal task, the required temperature is 95° C.

8. The mouse pad fabrication method as claimed in claim 1 in which during the edge removal task, the required pressure is 20 kg/cm$^2$.

9. The mouse pad fabrication method as claimed in claim 1 in which during the edge removal task, the required period is 10 minutes.

* * * * *